United States Patent [19]
Yalowitz et al.

[11] Patent Number: 4,797,884
[45] Date of Patent: Jan. 10, 1989

[54] REDUNDANT DEVICE CONTROL UNIT

[75] Inventors: Charles I. Yalowitz; Ronald D. Harris, both of Johnson City, Tenn.

[73] Assignee: Texas Instruments Incorporated, Dallas, Tex.

[21] Appl. No.: 913,138

[22] Filed: Sep. 29, 1986

[51] Int. Cl.$^4$ .............................................. G06F 11/20
[52] U.S. Cl. .......................................... 371/9; 364/187
[58] Field of Search ................. 371/8, 9, 11; 364/187, 364/200 MS FILE, 900 MS FILE

[56] References Cited

U.S. PATENT DOCUMENTS

| | | | |
|---|---|---|---|
| 4,437,154 | 3/1984 | Eisele | 371/9 X |
| 4,521,871 | 6/1985 | Galdun | 364/187 X |
| 4,542,506 | 9/1985 | Oe | 371/9 |
| 4,562,528 | 12/1985 | Baba | 371/9 X |
| 4,672,529 | 6/1987 | Kupersmit | 364/187 X |

Primary Examiner—Jerry Smith
Assistant Examiner—Robert W. Beausoliel
Attorney, Agent, or Firm—James P. McAndrews; John A. Haug; Melvin Sharp

[57] ABSTRACT

An industrial, digitally controlled processing system including two nominally identical electronic devices connected in the system in a manner such that one of the devices functions as an active device in the system and the other device functions as a standby device, in which each device includes a back-up control unit including an optical fiber link for establishing communication between the device and the other nominally identical device, the unit being operative for determining whether the device is presently functioning as an active or standby device and for receiving signals indicating whether the other nominally identical device is functioning as an active or standby device, and for synchronizing the operation of the device with that of the other nominally identical device, and having a switch responsive, when the device is functioning as the standby device, to the occurrence of a failure in the other nominally identical device for causing the device to begin operating as the active device.

2 Claims, 1 Drawing Sheet

Microfiche Appendix Included
(30 Microfiche, 2870 Pages)

HOT BACKUP CARD BLOCK DIAGRAM

REDUNDANT DEVICE CONTROL UNIT

REFERENCE TO MICROFICHE APPENDIX

A microfiche appendix is attached to the present specification, and forms part of the present application. This microfiche appendix is entitled HBU. It consists of a total number of 30 microfiche and a total number of 2870 frames.

BACKGROUND OF THE INVENTION

The present invention relates to a system and method for establishing communication and cooperation between two nominally identical electronic devices to enable either device to be operated as an active device and the other to serve as a backup, or standby, device.

In many industrial systems, it is considered advantageous, if not essential, to provide redundancy with respect to at least certain devices. This occurs, for example, in the case of computerized industrial systems employing devices known as progammable controllers, where it is desired, at certain points in the system, to provide two structurally and functionally identical controllers, with one functioning as the active device in the system and the other being a standby device which, in the event of a failure in the active device, can take over its function.

Programmable controllers belong to the class of relatively "intelligent" devices which are provided with their own microprocessor and memories and which are programmed to carry out preselected operating sequences in response to instructions from a central control unit and in response to data derived from the operations being performed. Thus, the operation of such controllers involves a continuous exchange of data and instructions with other devices in the system, and the operation performed by such a controller at any given time is dependent on the data and instructions previously supplied thereto.

Heretofore, in situations where a standby device was provided, it has been the usual practice to interconnect the active and standby devices by a separate device which controls the relationship therebetween and to cause the standby device to remain completely idle as long as the active device is functioning properly. If a failure should occur in the active device, it is necessary to transmit a large mass of data to the backup device before it can be switched to take over the function of the active device. This requires a relatively long processing time during which neither of the two process controllers is active.

SUMMARY OF THE INVENTION

It is an object of the present invention to eliminate delays in the switching on of a standby device in the event of a failure in the presently active device.

Another object of the invention is to eliminate the need for a separate unit for controlling the operating condition of each such device.

A further object of the invention is to establish continuous communication between two redundant devices and to cause the diagnosis of a failure of the presently active device to be performed within the circuitry of the device itself.

The above and further objects are achieved, according to the invention, in an industrial, digitally controlled processing system including two nominally identical electronic devices connected in the system in a manner such that one of the devices functions as an active device in the system and the other device functions as a standby device, by the improvement wherein each said electronic device comprises a back-up control unit comprising:

communication means including an optical fiber link for establishing communication between the device and the other nominally identical device;

control means connected to the communication means for determining whether the device is presently functioning as an active or standby device and for receiving, from the communication means, signals indicating whether the other nominally identical device is functioning as an active or standby device;

synchronizing means connected to the communication means for synchronizing the operation of the device with that of the other nominally identical device; and switching means connected to the communication means and responsive, when the device is functioning as the standby device, to the occurrence of a failure in the other nominally identical device for causing the device to begin operating as the active device.

Thus, the invention achieves the previously stated objects by including identical circuit arrangements or back-up control units, in each device, which circuit arrangements continuously communicate with each other to control selection of the active and standby devices, causes the standby device to receive the same program and data signals as the active device, and maintains synchronism between the devices.

In further accordance with the invention, the two devices are caused to both operate continuously in loose synchronism, in that the operation of the two devices is synchronized only at certain points in time, normally corresponding to those times when a specific routine, or major function, has been completed. Between synchronizations, the two devices, being nominally identical and receiving the same input signals, will operate at approximately the same rate. However, because of inevitable differences between any two devices, there will be some variation in operating speed. By synchronizing the two devices only at specific times, the amount of synchronizing information which must be exchanged by the devices is minimized, while the required degree of synchronization to assure that the standby device can take over the function of the active device with a minimum delay is maintained.

While both devices always receive the same data and program input signals, only the currently active device will produce output signals.

Preferably, synchronization is performed by causing each device to emit a characteristic signal at the completion of each predetermined major function. The completion signal from the circuit arrangement of each device is transmitted to that of the other device and performance of the next major function in each device is delayed until both circuit arrangements have emitted the appropriate completion signal.

According to a further feature of the invention, the circuit arrangements, or hot back-up units, of the two devices are connected together by two optical fibers each conducting signals in a single, respective direction.

In further accordance with the invention, each device has the capability of diagnosing its operating state and upon detecting a fault in the active device, the associated circuit arrangement signals the circuit arrangement of the other device to take over the active device function.

The circuit arrangements are further operative to establish a procedure to determine which device will initially be active in the absence of an external instruction.

BRIEF DESCRIPTION OF THE DRAWING

The sole FIGURE is a block diagram of a preferred embodiment of a control unit according to the invention.

DESCRIPTION OF THE PREFERRED EMBODIMENTS

Figure 1:
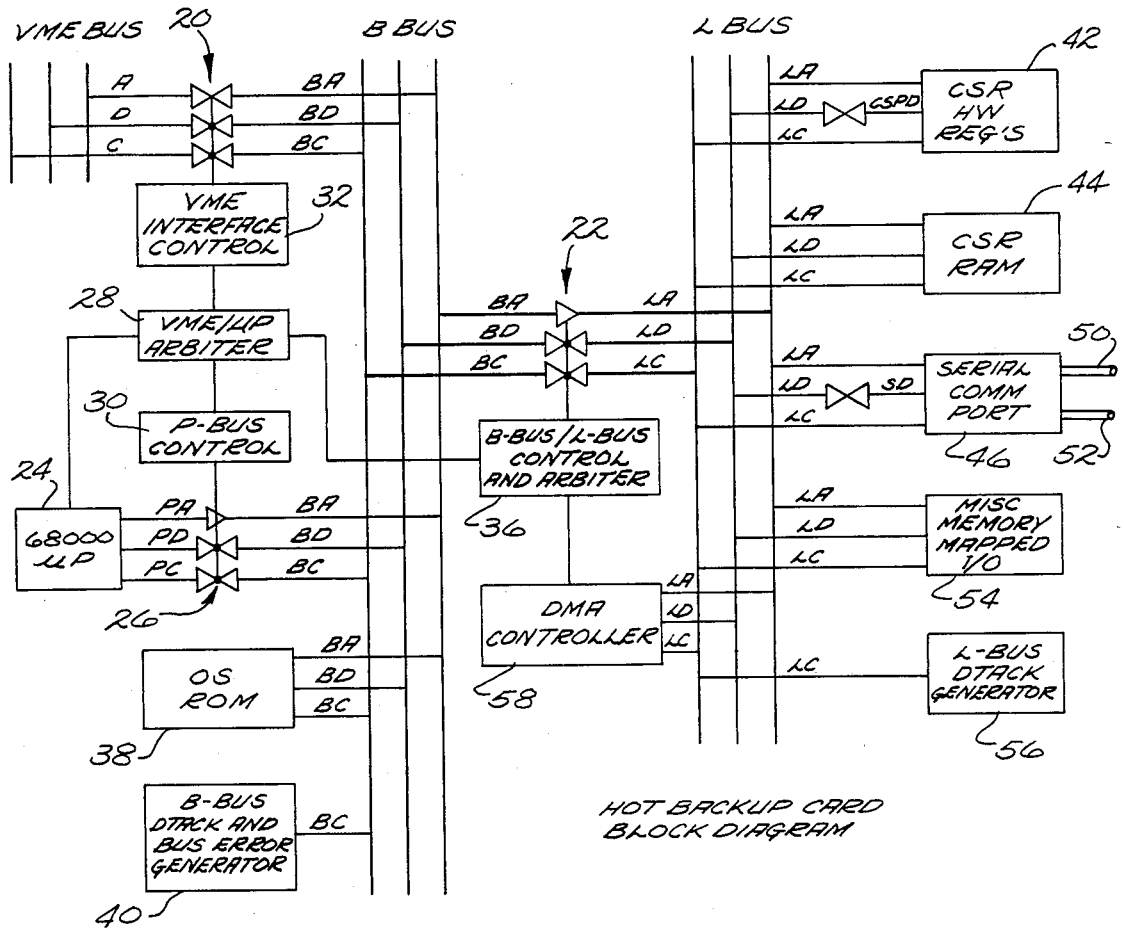

The sole FIGURE is a block circuit diagram of one suitable embodiment of the hot back-up unit, or circuit arrangement, according to the present invention, which is to be installed into a progammable controller, the illustrated card being specifically constructed for use with a controller marketed by Texas Instruments Incorporated, under the designation: 560 System programmable controller. Preferably, the circuit arrangement is assembled as a plug-in circuit card, or board.

The above-mentioned programmable controller cnntains two further cards, these being a central processing unit card and a remote channel controller card which controls communication between the controller and external input/output devices. Each of these further cards includes a programmable memory in the form of an EPROM containing programming which controls the operation of that card. For performance of the operations contemplated by the invention, these further cards cooperate with the hot back-up unit and each of those EPROMS must be appropriately configured, or programmed, for this purpose.

The circuit shown in the FIGURE includes a VME bus, which is an industry-standard bus utilized to interconnect the electronic components in a device, i.e. to connect the components of the hot back-up card with the components mounted on the other cards in the controller. The card is provided with three further buses, a B (buffer) bus, an L (local) bus, and a P (microprocessor) bus.

Each bus is composed of three groups of parallel lines: a group of address lines A; a group of data lines D; and a group of control lines C. In a specific operative embodiment of the system, each A conductor shown in FIG. 1 is composed of 24 parallel address lines, each D conductor is composed of 16 parallel data lines and each C conductor is composed of 10 parallel control lines.

All lines of the VME bus are connected to corresponding lines of the B bus via a first set of controllable directional couplers 20, there being one such coupler associated with each line, although only three couplers are illustrated for purposes of simplicity. Similarly, each line of the B bus is coupled to a respective line of the L bus via a second set of controllable directional couplers 22. In this case, the address lines are coupled via unidirectional couplers which permit transmission only from the B bus to the L bus, whereas all data and control lines are connected via bidirectional couplers.

Overall operation of the illustrated circuit is controlled by a microprocessor 24, which, in an operating embodiment of the invention, is a Motorola 68000 microprocessor. Microprocessor 24 is coupled to all of the lines of the B bus via its P bus and a further set of directional couplers 26, including unidirectional couplers for permitting transmission only in the direction from the microprocessor address lines PA to the B bus address lines BA, whereas bidirectional couplers are provided to permit transmission in either direction between the microprocessor data lines PD and control lines PC and the corresponding B bus lines BD and BC.

Microprocessor 24 is connected to a first arbiter 28 which, in turn, controls the operation of a controller 30 for controlling the on/off state and conduction direction of the couplers 26 connected to the P bus associated with microprocessor 24, and of a VME interface control 32 which performs a similar function with respect to the couplers 20.

Arbiter 28 is further connected to a control and arbiter 36 which, in turn, is connected to control the on/off states and transmission directions of couplers 22. Devices 28 and 36 cooperate to control the routing of signals over the B and L buses in accordance with the existing operating conditions. By way of example, if the illustrated circuit is operating in its standby mode and receives an instruction to enter the active mode, these devices will cause the circuit to complete its operating cycle in the standby mode and to then shift to its active mode.

Also connected to the B bus is an operating system ROM 38 which supplies instructions only to microprocessor 24, and a B bus data transfer acknowledge and bus error generator 40.

The unit illustrated in the FIGURE includes a configuration status register including hardware registers 42 and a RAM 44. Block 42 includes status registers and control registers which contain information identifying the unit as a hot back-up card, while block 44 contains data which control the exchange of messages between the card and other cards in the system. Block 44 can be accessed by microprocessor 24 using local or logical addressing. Master devices connected to the VME bus can access registers 42 using logical or geographical addressing. Block 42 includes a software reset, a logical address register, a geographical address register, an error register, a hardware revision register, a semaphore register and an exception register.

The circuit arrangement further includes a serial communications port 46 constituting a serial link connected to two optical fibers 50 and 52 each conducting signals in a respective direction between the illustrated circuit arrangement and an identical circuit arrangement provided in the other redundant device. Port 46 is constructed to automatically generate the required message framing bits in the transmit mode and to check the CRC bytes and eliminate framing bits from received data. Port 46 further includes circuitry which informs microprocessor 24, by way of an interrupt, that a complete message has been received. Received data is synchronized to a receive clock by a digital phase lock loop running at eight times the transmitted frequency. Port 46 is composed of a transmit port coupled to optical fiber 50 and having a high speed line driver controlling a fiber optic light emitting diode. Port 46 additionally includes a receiving port including an integrated fiber optic receiver coupled to optical fiber 52 and producing a TTL level output signal. Optical fibers 50 and 52 will be in the form of twin glass core fibers molded into a duplex PVC coated cord to form a single cable. This cable can be connected to port 46 by means of a screw-type connector.

There are further included a miscellaneous memory mapped input/output device 54 which includes general purpose timers, including a system rate generator and a communications timer for the card, as well as various switches and indicators, including a switch which is operative to initially set the device in which the card is installed to the active or standby operating status. The position of this switch can be read by microprocessor 24 from information which is fed to port 46. The indicators include four LED indicators provided on a front panel to indicate, respectively, that the card is operational, the associated device is in its active status, the associated device is in its standby status, and that communications exist between the back-up cards of the two redundant devices.

Finally, the system includes an L bus data transfer acknowledge generator 56 and a DMA controller 58. Controller 58 controls data transfer between RAM 44 and port 46 and contains two channels each capable of controlling transmission in a respective direction, with transmission in only one direction being permitted at any given time.

Controller 58 is controlled by microprocessor 24, with controller 58 generating appropriate signal transfer addresses.

The Microfiche Appendix attached hereto provides the programming which is loaded into ROM 38 and which is used by microprocessor 24 to control operation of the illustrated circuit in the desired manner. The attached Microfiche Appendix also contains the programming for the EPROMS of the central processing unit card and the remote channel controller card of the programmable controller.

At the start of operation of a system which includes two redundant devices each containing a circuit having the form illustrated in the FIGURE, each device is powered up and undergoes its own internal diagnostics sequence. The back-up cards of the two devices, e.g. of two programmable controllers, then attempt to establish communication via optical fibers 50 and 52. Once communication has been established, a selection of the active and standby devices must be made. If the switches of the two back-up cards are set to select one device as the active device and the other as the standby, then the selection of respective functions is made accordingly, provided that prior to that time, neither device was operating as an active device. That card whose switch is set to the active setting must nevertheless determine whether the other device has acquired active status. If both cards have the same switch setting, then a random number will be generated as a delay before active status is selected.

If no communications are established via optical fibers 50 and 52, each card will monitor the activity on the input/output ports of the devices and if, after a selected time, no activity is detected, each card will initiate communications with that port. Once it has been determined that both devices are not attempting to take over active status, one device is selected to be active.

After that selection has been made, the user progam is loaded into the active unit and is downloaded from there into the standby unit, so that both devices contain the same programs, and associated timers and counters are initialized to the same settings. Both devices will prepare to begin execution of the previously supplied user program and will be initially synchronized via their respective back-up cards to begin execution of the program.

During running of that program, the two devices will be loosely synchronized, as described earlier herein, by the transmission, via optical fibers 50 and 52, of signals indicating the completion, in each device, of each major task, which tasks include, for example, logic scan, input/output cycle, SF module processing, etc. During running of a program, the standby device will only receive signals supplied to both devices and signals generated by the active device, while the active device will both receive and transmit. If the standby device should miss a communication, it will automatically generate a request for retransmission thereof via optical fibers 50 and 52. If the standby device should miss several transmissions in a row, it will cease requesting retransmission, but will automatically become deactivated.

If the back-up card of the standby device determines, on the basis of its monitoring of signals transmitted by the active device, that the active device has failed, the back-up card of the standby device will automatically cause the standby device to take over the function of the active device.

The function of the active device will also be taken over by the standby device if the internal diagnostics of the active device indicate that that device has failed, in which case the back-up card of that device will send a signal to the corresponding card of the standby device to cause the latter device to assume active status.

Since both devices receive all communications supplied thereto and, in addition, the standby device receives all signals emitted by the active device prior to the occurrence of a failure in the active device, the standby device can take over active status very quickly after such failure occurs and can continue the ongoing process without any interruption.

Each circuit block shown in the FIGURE is made up of commercially available circuit units, or chips, assembled in accordance with principles known in the art. Attached hereto, and forming part of this specification, is an Appendix 2 consisting of 22 sheets containing a complete diagram of the circuit arrangement shown in the FIGURE.

It will be understood that the above description of the present invention is susceptible to various modifications, changes and adaptations, and the same are intended to be comprehended within the meaning and range of equivalents of the appended claims.

What is claimed is:

1. An industrial, digitally controlled processing system including two nominally identical electronic devices each operable in response to instructions from a control unit and to data derived from operations being performed by the processing system, each said electronic device being connected in the system in a manner such that one of the devices functions as an active device in the system regulating an operating sequence of the system including a plurality of specific, different system routines and the other device functions as a standby device, each said electronic device comprising internal diagnostic means operative for diagnosing the operating status of said device and selecting means for placing said device in a condition to operate as an active device or a standby device, and each said electronic device comprising a back-up control unit comprising:

communications means including an optical fiber link for establishing communication between said device and the other nominally identical device;

control means connected to said communication means for determining whether said device is presently functioning as an active or standby device and for receiving, from said communication means, signals indicating whether the other nominally identical device is functioning as an active or a standby device;

synchronizing means connected to said communication means for synchronizing the operation of the device acting as an active device with that of the other nominally identical device acting as the standby device at selected limited points in the operating sequence of the system at which specific routines thereof are completed to maintain the nominally identical standby device substantially synchronized with the active device as the active device responds to data derived from operations being performed by the processing system; and switching means connected to said communication means and responsive, when said device is functioning as the standby device, to the occurrence of a failure in the other nominally identical device during performance of a routine in the operating sequence of the system for causing said device to begin operating as the active device promptly after ending of said routine with improved synchronization relative to the operating sequence of the system.

2. A system as defined in claim 1 wherein internal diagnostic means in the device which is active when said failure occurs during said routine is operative for initiating switch over of the standby device to begin operating as the active device at the end of said routine.

* * * * *